United States Patent
Ungrady, III et al.

(10) Patent No.: US 11,059,213 B2
(45) Date of Patent: Jul. 13, 2021

(54) METHOD OF BLOW MOLDING A PLASTIC CONTAINER

(71) Applicant: GRAHAM PACKAGING COMPANY, L.P., Lancaster, PA (US)

(72) Inventors: Eric B. Ungrady, III, Mt. Wolf, PA (US); Matthew A. Russell, Red Lion, PA (US); Hope Lee Townsend, Suwanee, GA (US); Michael L. James, Hamilton, OH (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 435 days.

(21) Appl. No.: 16/019,810

(22) Filed: Jun. 27, 2018

(65) Prior Publication Data
US 2019/0039277 A1    Feb. 7, 2019

Related U.S. Application Data

(60) Continuation of application No. 14/937,272, filed on Nov. 10, 2015, now abandoned, which is a division of
(Continued)

(51) Int. Cl.
*B29C 49/48* (2006.01)
*B29C 49/00* (2006.01)
(Continued)

(52) U.S. Cl.
CPC ...... *B29C 49/0078* (2013.01); *B29C 33/3842* (2013.01); *B29C 49/48* (2013.01);
(Continued)

(58) Field of Classification Search
CPC .......... B65D 1/023; B65D 1/0246; B29C 2949/78117; B29C 2949/7863; B29C 33/3842
See application file for complete search history.

(56) References Cited

U.S. PATENT DOCUMENTS

| 4,180,175 A | 12/1979 | Virog et al. |
| 4,715,504 A | 12/1987 | Chang et al. |

(Continued)

FOREIGN PATENT DOCUMENTS

WO    WO 2004/007291 A1    1/2004

OTHER PUBLICATIONS

Prabodh C. Bolur, Plastics Part design and Moldability; https://web.archive.org/web/20081122033409/http://www.pitfallsinmolding.com/partdesign1.html (Year: 2008).*
(Continued)

*Primary Examiner* — Nahida Sultana
*Assistant Examiner* — Debjani Roy
(74) *Attorney, Agent, or Firm* — Stradley Ronon Stevens and Young, LLP (57) ABSTRACT

A plastic container has a main body portion, a neck portion and a molded feature such as an anti-rotation lug adjacent to the neck portion. The molded feature has a volume that is less than a volume that would be defined by the maximum external dimensions of the feature. This reduces the shrinkage differential between the molded feature and the neck portion, which could otherwise cause sealing problems with a closure as a result of deformation of the neck portion. A method of blow molding a plastic container with a reduced volume of the molded feature is also disclosed.

20 Claims, 7 Drawing Sheets

Related U.S. Application Data application No. 13/246,967, filed on Sep. 28, 2011, now Pat. No. 9,211,967.

(51) Int. Cl.

| | | |
|---|---|---|
| *B65D 1/02* | (2006.01) | |
| *B29C 33/38* | (2006.01) | |
| *B29K 67/00* | (2006.01) | |
| *B29K 105/00* | (2006.01) | |
| *B29L 31/00* | (2006.01) | |

(52) U.S. Cl.
CPC ........... *B65D 1/023* (2013.01); *B65D 1/0207* (2013.01); *B65D 1/0246* (2013.01); *B29C 2049/4897* (2013.01); *B29K 2067/003* (2013.01); *B29K 2105/258* (2013.01); *B29L 2031/7158* (2013.01); *B65D 2255/20* (2013.01)

(56) References Cited

U.S. PATENT DOCUMENTS

| | | | |
|---|---|---|---|
| 5,224,615 A * | 7/1993 | Hickerson | B65D 50/04 215/201 |
| 5,447,766 A | 9/1995 | Orimoto et al. | |
| 5,511,677 A | 4/1996 | Oder | |
| 5,887,739 A | 3/1999 | Prevot et al. | |
| 5,938,054 A | 8/1999 | Loader | |
| 5,979,681 A | 11/1999 | Varlet et al. | |
| 7,891,510 B2 | 2/2011 | Loughrin et al. | |
| 2002/0011498 A1 | 1/2002 | Giblin et al. | |
| 2002/0134747 A1 | 9/2002 | Babcock et al. | |
| 2004/0140325 A1 | 7/2004 | Flaig et al. | |
| 2006/0198974 A1 | 9/2006 | Miller | |
| 2007/0062900 A1 | 3/2007 | Manera et al. | |
| 2009/0230076 A1 | 9/2009 | Roubal et al. | |
| 2010/0270256 A1 | 10/2010 | Penny | |

OTHER PUBLICATIONS

U.S. Appl. No. 13/246,967 (U.S. Pat. No. 9,211,967), filed Sep. 28, 2011 (Dec. 15, 2015).
U.S. Appl. No. 14/937,272 (US 2016/0059441), filed Nov. 10, 2015 (Mar. 3, 2016).
U.S. Appl. No. 14/937,272, Jun. 8, 2018 Applicant Initiated Interview Summary.
U.S. Appl. No. 14/937,272, Apr. 10, 2018 Final Office Action.
U.S. Appl. No. 14/937,272, Mar. 5, 2018 Response to Non-Final Office Action.
U.S. Appl. No. 14/937,272, Dec. 4, 2017 Non-Final Office Action.
U.S. Appl. No. 13/246,967, Nov. 10, 2015 Issue Fee Payment.
U.S. Appl. No. 13/246,967, Aug. 10, 2015 Notice of Allowance.
U.S. Appl. No. 13/246,967, Jul. 14, 2015 Response to Final Office Action.
U.S. Appl. No. 13/246,967, May 14, 2015 Final Office Action.
U.S. Appl. No. 13/246,967, Feb. 20, 2015 Responses to Non-Final Office Action.
U.S. Appl. No. 13/246,967, Feb. 5, 2015 Applicant Initiated Interview Summary.
U.S. Appl. No. 13/246,967, Oct. 23, 2014 Non-Final Office Action.
International Search Report dated Apr. 24, 2013 in International Application No. PCT/US2012/057993.
Prabodh C. Bolur; Plastics Part Design and Moldability; Available Nov. 22, 2008. https://web.archive.org/web/20081122033409/http://www.pitfallsinmolding.com/partdesign 1. html.

\* cited by examiner

METHOD OF BLOW MOLDING A PLASTIC CONTAINER

CROSS REFERENCE TO PRIOR APPLICATIONS

This application is a Continuation of U.S. patent application Ser. No. 14/937,272, filed Nov. 10, 2015, which is a Divisional of U.S. patent application Ser. No. 13/246,967, filed Sep. 28, 2011, now U.S. Pat. No. 9,211,967, issued Dec. 15, 2015. The contents of the above applications are hereby incorporated by reference.

BACKGROUND OF THE INVENTION

Field of the Invention

This invention relates generally to the field of packaging, and more specifically to molded plastic containers of the type that have neck or finish portion that is constructed and arranged to form a seal with respect to a closure.

Description of the Related Technology

Plastic containers are typically fabricated using either injection molding or one of two types of blow molding. The blow molding process is characterized by using internal pressure to force a hot, soft plastic preform or parison against a molding surface. Blow molding can be performed using either a reheat stretch blow molding process, which is typical for plastic containers that are fabricated from polyethylene terephthalate (PET), or an extrusion blow molding process, which is typical for containers that are fabricated from such materials as high-density polyethylene and polyolefins.

In the extrusion blow molding process, a molten tube or parison is continuously extruded from an extrusion fixture. A mold assembly that moves at a speed that is substantially equal to the speed of the extruded parison periodically captures portions of the parison, and pressurization as applied to inflate the captured portion of the parison against the interior surfaces of the mold assembly. The mold assembly is typically mounted for motion on either a molding wheel, which moves in a circular path, or on a shuttle, which moves the mold assembly on a substantially straight path.

Plastic containers typically include a neck or finish portion having an opening that is in communication with the interior space of the container. In some instances, the neck or finish portion is threaded to permit application of a closure. In other cases, structure is molded into the neck or finish portion to permit a closure to be snapped on. The neck or finish portion typically includes at least one sealing surface that is adapted to bear against a portion of a closure in order to form a liquid tight seal with respect to the closure when it is properly applied.

Figure 1:
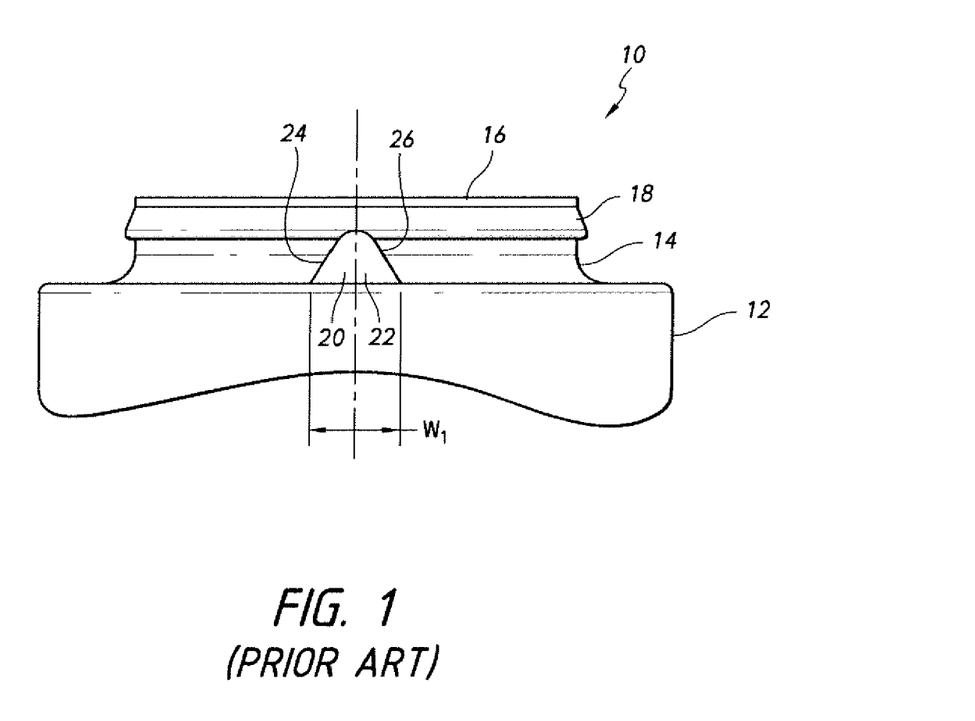
FIG. 1 is a fragmentary front elevational view of a portion of a conventional plastic container having a molded feature adjacent to a neck portion.
Figure 2:
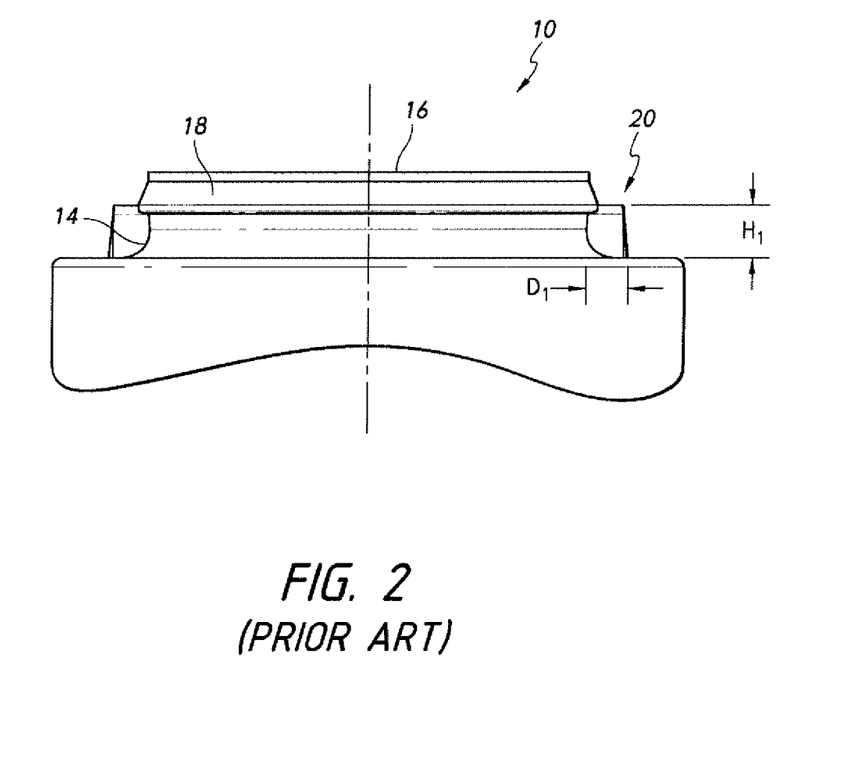
FIG. 2 is a fragmentary side elevational view of a portion of the conventional container that is shown in FIG. 1.

As is shown in FIGS. 1 and 2, one type of conventional plastic container 10 includes a main body portion 12 and a neck portion 14. The neck portion 14 has an upper lip 16 that defines an opening and a sealing surface 18 that is constructed and arranged to form a seal with respect to an applied closure. A molded feature such as an anti-rotation lug 20 is provided adjacent to the neck portion. The anti-rotation lug 20 had a generally triangular shape when viewed in side elevation, with a first inclined side surface 24, a second inclined side surface 26 and a solid outer surface 22 facing away from the neck portion 14. It had a maximum width WI, a maximum height H1 and a maximum radial depth D1. The anti-rotation lug 20 functioned to prevent or deter a closure from being unscrewed from the neck portion 14 by a consumer after it has been applied by the manufacturer. In the case of such containers, the anti-rotation lug 20 was integral with the neck portion 14 at a part of the neck portion 14 that was nearby the sealing surface 18.

Some of these containers 10 experienced a deformation condition known as ovalization, in which the neck or finish portion 14 deviated from its ideal substantially cylindrical shape. This created sealing problems with respect to an applied closure. The inventors herein have identified a cause of such ovalization as being uneven shrinkage of the neck or finish portion after the hot molded container is removed from the mold. It has been determined that the thermal mass of the anti-rotation lug was a significant factor in causing the uneven shrinkage.

A need exists for an improved molded plastic container having a neck or finish portion that is adjacent to a molded feature that is less susceptible to deformation as a result of uneven cooling after the container has been removed from the mold. A need also exists for a method of correcting a sealing problem in such a container that is caused at least in part by the presence of the molded feature.

SUMMARY OF THE INVENTION

Accordingly, it is an object of the invention to provide an improved molded plastic container having a neck or finish portion that is adjacent to a molded feature that is less susceptible to deformation as a result of uneven cooling after the container has been removed from the mold.

It is further an object of the invention to provide a method of correcting a sealing problem in such a container that is caused at least in part by the presence of the molded feature.

In order to achieve the above and other objects of the invention, a plastic container that is constructed according to a first aspect of the invention includes a main body portion having an inner surface that defines an interior space. The container further includes a neck portion having an opening that is in communication with the interior space. In addition, the container includes a molded feature that is adjacent to the neck portion. The molded feature has a space defined therein so that it occupies a volume that is less than a volume defined by the maximum external dimensions of the molded feature, whereby distortion of the neck portion as a result of differential cooling during the fabrication process is reduced.

A method of correcting a sealing problem in a plastic container having a main body portion defining an interior space, a neck portion defining an opening and having a sealing surface that is designed to seal with respect to a closure and a molded feature that is integral with the neck portion according to a second aspect of the invention includes steps of identifying a sealing problem that is created by differential shrinkage of the molded feature with respect to another portion of the container; and reducing the volume of the molded feature with respect to a volume that is defined by the maximum external dimensions of the molded feature.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
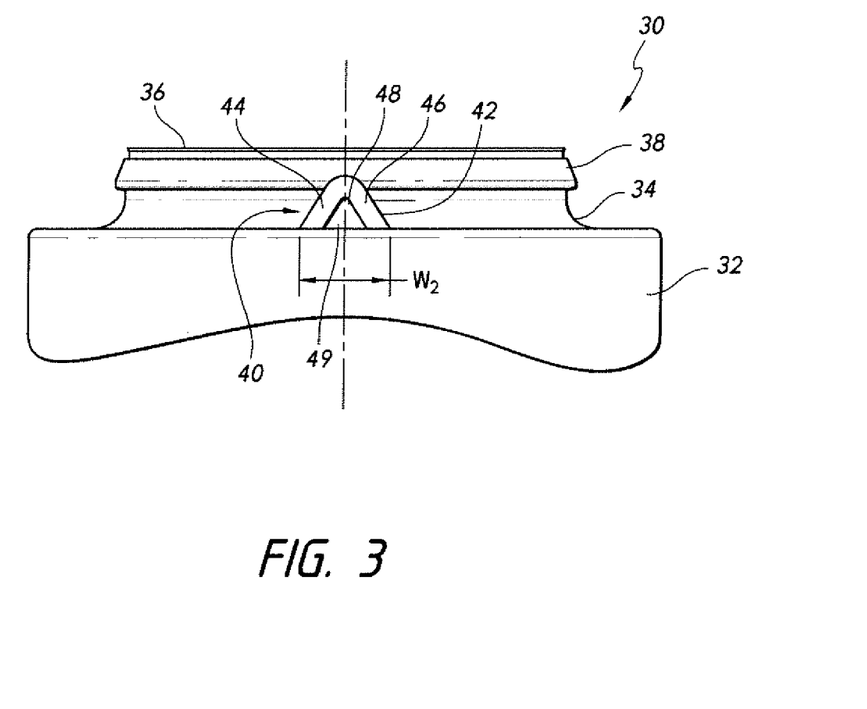
FIG. 3 is a fragmentary front elevational view of a portion of a plastic container that is constructed according to a first embodiment of the invention.

Referring now to the drawings, wherein like reference numerals designate corresponding structure throughout the views, and referring in particular to FIG. 3, a plastic container 30 according to a first embodiment of the invention includes a main body portion 32 that has an inner surface that defines an interior space and a neck portion 34 having an opening defined by an upper lip 36 that is in communication with the interior space. A sealing surface 38 is provided in the neck portion 34 for providing a seal with respect to a closure.

The plastic container 30 is preferably fabricated from a plastic material such as high-density polyethylene using an extrusion blow molding process. Alternatively, the plastic container 30 could be fabricated from a material such as polyethylene terephthalate (PET) using a reheat stretch blow molding process. As another possible alternative, plastic container 30 could be fabricated using injection molding.

Referring again to FIG. 3, it will be seen that plastic container 30 includes a molded feature 40 that is adjacent to the neck portion 34. In this embodiment, the molded feature 40 is an anti-rotation lug 42 that has a generally triangular shape when viewed in side elevation. The anti-rotation lug 42 includes a first side portion 44, a second side portion 46, with the first and second side portions 44, 46 being separated by an upper opening 48 that is embodied as a slot that extends substantially radially.

The anti-rotation lug 42 preferably has a maximum width W2, which is the maximum external dimension of the molded feature 40. It further has a maximum height H2 and a maximum radial depth D2.

Figure 4:
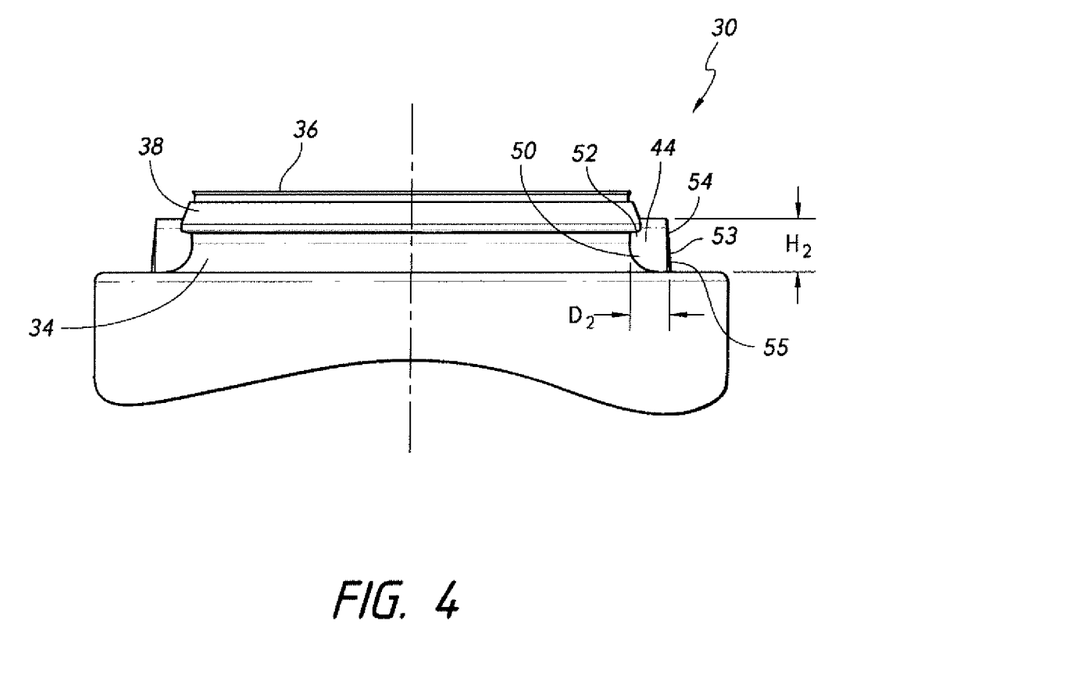
FIG. 4 is a fragmentary side elevational view of a portion of the plastic container that is shown in FIG. 3.

The anti-rotation lug 42 further preferably has a first portion 52, best shown in FIG. 4, which is integral with the neck portion 34 and a second portion 54 having an outer surface 55 that faces radially outwardly. A cavity 49 is defined within the anti-rotation lug 42. The cavity 49 is preferably defined in the outer surface 55 of the second portion 54.

Because of the presence of the cavity 49 and the opening 48, the molded feature 40 occupies a volume that is less than a volume that would otherwise be defined by the maximum external dimensions of the molded feature 40. In addition, the surface area of the molded feature 40 is substantially increased relative to what it would have been in the event that the molded feature 40 was solid plastic, as was the molded feature in the conventional container that is described above with respect to FIGS. 1 and 2. As a result, the molded feature 40 will cool and shrink when removed from the mold at a rate that is more similar to adjacent structure, such as the neck portion 34, it would be the case if there were solid. Accordingly, distortion of the sealing surface 38 is minimized.

Figure 7:
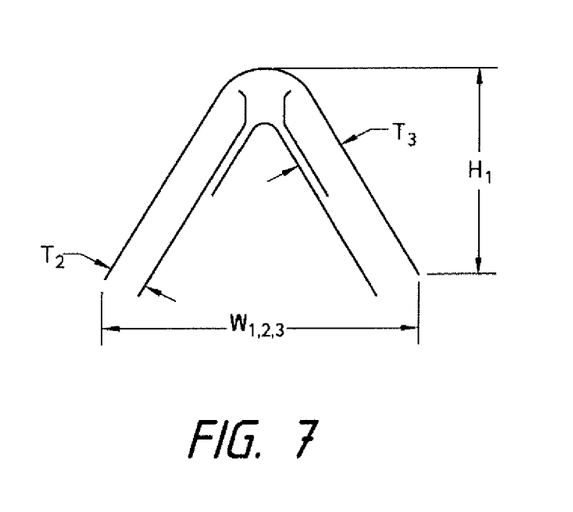
FIG. 7 is a diagrammatical depiction of the volumetric reduction that is accomplished in a molded feature in the different embodiments of the invention.

The anti-rotation lug 42 further preferably is shaped so as to have a maximum wall thickness T2, best shown in FIG. 7, which is defined between the cavity 49 and the respective outer surfaces of the first and second side portions 44, 46.

Figure 5:
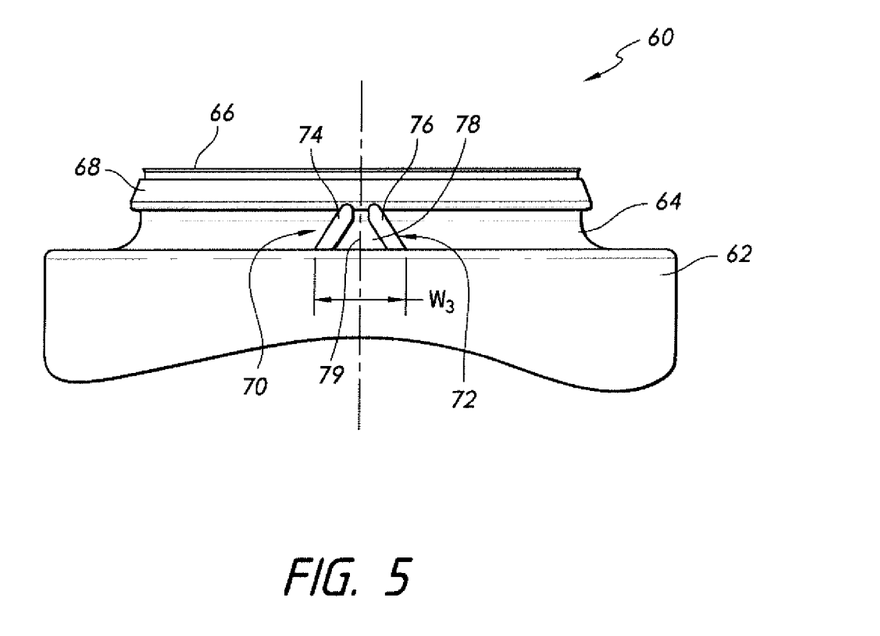
FIG. 5 is a fragmentary front elevational view of a portion of a plastic container that is constructed according to a second embodiment of the invention.
Figure 6:
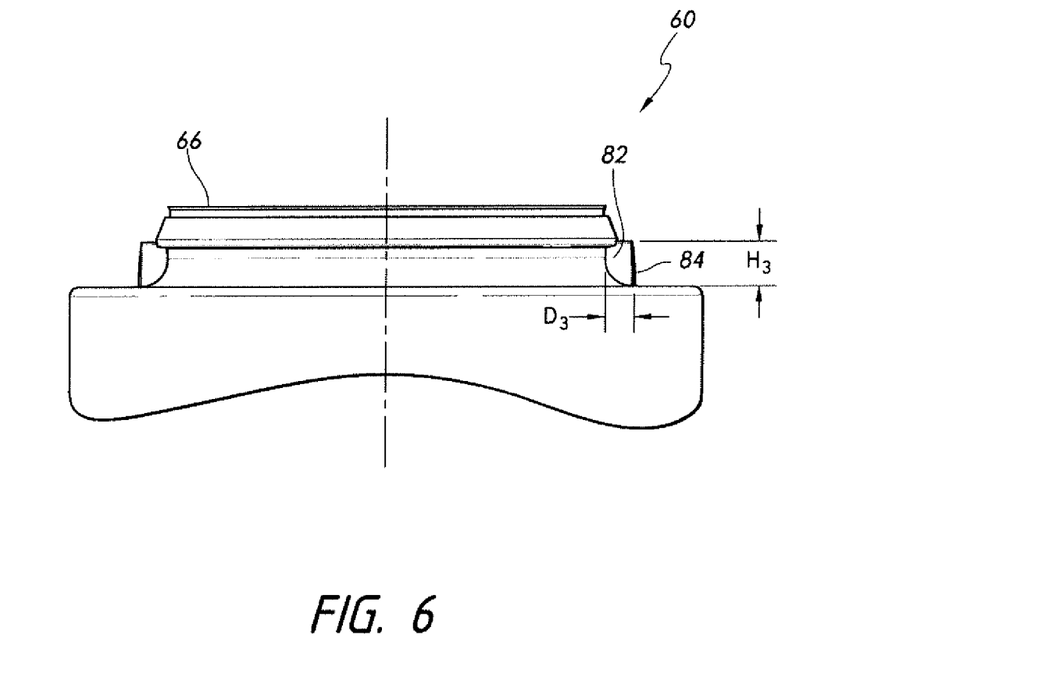
FIG. 6 is a fragmentary side elevational view of another portion of the plastic container that is shown in FIG. 5.

A plastic container 60 according to a second embodiment of the invention is depicted in FIGS. 5 and 6. it includes a main body portion 62 that has an inner surface that defines an interior space and a neck portion 64 having an opening defined by an upper lip 66 that is in communication with the interior space. A sealing surface 68 is provided in the neck portion 64 for providing a seal with respect to a closure.

The plastic container 60 is preferably fabricated from a plastic material such as high-density polyethylene using an extrusion blow molding process. Alternatively, the plastic container 60 could be fabricated from a material such as polyethylene terephthalate (PET) using a reheat stretch blow molding process. As another possible alternative, plastic container 30 could be fabricated using injection molding.

Referring again to FIG. 5, it will be seen that plastic container 60 includes a molded feature 70 that is adjacent to the neck portion 64. In this embodiment, the molded feature 70 is an anti-rotation lug 72 that has a generally triangular shape when viewed in side elevation. The anti-rotation lug 72 includes a first side portion 74, a second side portion 76, with the first and second side portions 74, 76 being separated by an upper opening 78 that is embodied as a slot that extends substantially radially. The first and second side portions 74, 76 are thinner than those in the first embodiment described above, and the opening 78 is larger.

The anti-rotation lug 72 preferably has a maximum width W3, which is the maximum external dimension of the molded feature 40. It further has a maximum height H3 and a maximum radial depth D3.

The anti-rotation lug 72 further preferably has a first portion 82, best shown in FIG. 6, which is integral with the neck portion 64 and a second portion 84 having an outer surface 85 that faces radially outwardly. A cavity 79 is defined within the anti-rotation lug 72. The cavity 79 is preferably defined in the outer surface 85 of the second portion 84.

As a result of the presence of the cavity 79 and the opening 78, the molded feature 70 occupies a volume that is less than a volume that would otherwise be defined by the maximum external dimensions of the molded feature 70. In addition, the surface area of the molded feature 70 is substantially increased relative to what it would have been in the event that the molded feature 40 was solid plastic, as was the molded feature in the conventional container that is described above with respect to FIGS. 1 and 2. As a result, the molded feature 70 will cool and shrink when removed from the mold at a rate that is more similar to adjacent structure, such as the neck portion 64, it would be the case if there were solid. Accordingly, distortion of the sealing surface 68 is minimized.

The anti-rotation lug 72 further preferably is shaped so as to have a maximum wall thickness T3, which is defined between the cavity 79 and the respective outer surfaces of the first and second side portions 74, 76.

Preferably, a ratio of the volume occupied by the molded features 40, 70 to the volume defined by the maximum external dimensions of the respective molded features 40, 70 is substantially within a range of about 0.1 to about 0.8, more preferably substantially within a range of about 0.2 to about 0.7, and most preferably substantially within a range of about 0.3 to about 0.6.

Preferably, a ratio of the maximum wall thickness T2, T3 to the maximum external dimension of the molded feature 40, 70 is substantially within a range of about 0.05 to about 0.45, more preferably substantially within a range of about 0.1 to about 0.35 and most preferably substantially within a range of about 0.2 to about 0.3.

The presence of the cavity 49, 79 and the opening 48, 78 also causes a substantial increase in external surface area of the anti-rotation lug 42 relative to what it would have been without those features. Preferably, this increase in surface area is substantially at least about 10%.

Figure 8:
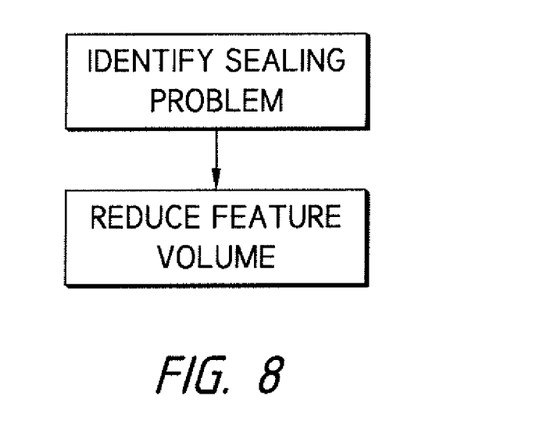
FIG. 8 is a flow chart depicting a method that is performed according to a preferred embodiment of the invention.

A preferred method of correcting a sealing problem in a plastic container of the type described above with respect to the two embodiments of the invention is shown diagrammatically in FIG. 8. It includes steps of identifying a sealing problem that is created by differential shrinkage of the molded feature with respect to another portion of the container, and reducing the volume of the molded feature with respect to a volume that is defined by the maximum external dimensions of the molded feature.

The step of reducing the volume of the molded feature is preferably performed by conducting a mold tooling change, and more specifically by revising the shape of the molded feature to include a cavity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of blow molding a plastic container, comprising:
    disposing a molten plastic in a mold;
    blow molding the molten plastic in the mold to form a blow molded article comprising a main body portion defining an interior space, a cylindrical neck portion having an opening that is in communication with the interior space, and a molded feature that is adjacent to the neck portion, the molded feature being configured to reduce ovalization of the neck portion, wherein the molded feature has a cavity defined therein so that the molded feature occupies a volume that is less than a volume defined by maximum external dimensions of the molded feature, the molded feature having a first portion that is integral with the neck portion and a second portion with a surface defining an opening into the cavity of the molded feature that faces in a direction that is substantially opposite from the neck portion to increase a surface area of the molded feature relative to what the surface area would have been if the molded feature were solid and without an opening; and
    removing the blow molded article from the mold.

2. The method of a blow molding the plastic container according to claim 1, wherein the volume of the molded feature is reduced by mold tooling.

3. The method of blow molding the plastic container according to claim 1, wherein the molded feature comprises an anti-rotation lug.

4. The method of blow molding the plastic container according to claim 1, wherein the molded feature has a generally triangular shape when viewed in side elevation.

5. The method of blow molding the plastic container according to claim 1, wherein a ratio of the volume occupied by the molded feature to the volume defined by the maximum external dimensions of the molded feature is within a range of about 0.1 to about 0.8.

6. The method of blow molding the plastic container according to claim 5, wherein the ratio is within a range of about 0.3 to about 0.6.

7. The method of blow molding the plastic container according to claim 1, wherein the molded feature has a maximum wall thickness, and wherein a ratio of the maximum wall thickness to the maximum external dimension of the molded feature is within a range of about 0.05 to about 0.45.

8. The method of blow molding the plastic container according to claim 1, wherein the main body portion, the neck portion, and the molded feature are fabricated from a material comprising high-density polyethylene.

9. The method of blow molding the plastic container according to claim 5, wherein the ratio is within a range of about 0.2 to about 0.7.

10. The method of blow molding the plastic container according to claim 7, wherein the ratio of the maximum wall thickness to the maximum external dimension of the molded feature is within a range of about 0.1 to about 0.35.

11. The method of blow molding the plastic container according to claim 10, wherein the ratio of the maximum wall thickness to the maximum external dimension of the molded feature is within a range of about 0.2 to about 0.3.

12. The method of blow molding the plastic container according to claim 1, wherein the increase in surface area is at least about 10%.

13. The method of blow molding the plastic container according to claim 1, further comprising the step of evaluating whether the container has a sealing problem.

14. A method of blow molding a plastic container, comprising:
    disposing a molten plastic in a mold;
    blow molding the molten plastic in the mold to form a blow molded article comprising a main body portion defining an interior space, a cylindrical neck portion having an opening that is in communication with the interior space, and a molded feature that is adjacent to the neck portion and defines an anti-rotation lug having a generally triangular shape when viewed in side elevation, the molded feature being configured to reduce ovalization of the neck portion, wherein the molded feature has a cavity defined therein so that the molded feature occupies a volume that is less than a volume defined by maximum external dimensions of the molded feature, the molded feature having a first portion that is integral with the neck portion and a second portion with a surface defining an opening into the cavity of the molded feature that faces in a direction that is substantially opposite from the neck portion to increase a surface area of the molded feature relative to what the surface area would have been if the molded feature were solid and without an opening, wherein a ratio of the volume occupied by the molded feature to the volume defined by the maximum external dimensions of the molded feature is within a range of about 0.1 to about 0.8; and removing the blow molded article from the mold.

15. The method of blow molding the plastic container according to claim 14, wherein the volume of the molded feature is reduced by mold tooling.

16. The method of blow molding the plastic container according to claim 14, wherein the molded feature has a maximum wall thickness, and wherein a ratio of the maximum wall thickness to the maximum external dimension of the molded feature is within a range of about 0.05 to about 0.45.

17. The method of blow molding the plastic container according to claim 14, wherein the main body portion, the neck portion, and the molded feature are fabricated from a material comprising high-density polyethylene.

18. The method of blow molding the plastic container according to claim 14, wherein the increase in surface area is at least about 10%.

19. The method of blow molding the plastic container according to claim 14, further comprising the step of evaluating whether the container has a sealing problem.

20. A method of blow molding a plastic container, comprising:

the step of evaluating whether the container has a sealing problem;

disposing a molten plastic in a mold;

blow molding the molten plastic in the mold to form a blow molded article comprising a main body portion defining an interior space, a cylindrical neck portion having an opening that is in communication with the interior space, and a molded feature that is adjacent to the neck portion and defines an anti-rotation lug having a generally triangular shape when viewed in side elevation, the molded feature being configured to reduce ovalization of the neck portion, wherein the molded feature has a cavity defined therein so that the molded feature occupies a volume that is less than a volume defined by maximum external dimensions of the molded feature, the molded feature having a first portion that is integral with the neck portion and a second portion with a surface defining an opening into the cavity of the molded feature that faces in a direction that is substantially opposite the neck portion to increase by about 10% of a surface area of the molded feature relative to what the surface area would have been if the molded feature were solid and without an opening, wherein a ratio of the volume occupied by the molded feature to the volume defined by the maximum external dimensions of the molded feature is within a range of about 0.1 to about 0.8, wherein the molded feature has a maximum wall thickness, and wherein a ratio of the maximum wall thickness to the maximum external dimension of the molded feature is within a range of about 0.05 to about 0.45; and removing the blow molded article from the mold.

* * * * *